(12) United States Patent
Truong

(10) Patent No.: US 9,207,794 B2
(45) Date of Patent: Dec. 8, 2015

(54) DISAMBIGUATION OF USER INTENT ON A TOUCHSCREEN KEYBOARD

(71) Applicant: Google Inc., Mountain View, CA (US)

(72) Inventor: Steven Chi Truong, Toronto (CA)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/144,455

(22) Filed: Dec. 30, 2013

(65) Prior Publication Data

US 2015/0185886 A1 Jul. 2, 2015

(51) Int. Cl.
*G06F 3/041* (2006.01)

(52) U.S. Cl.
CPC ..................... *G06F 3/041* (2013.01)

(58) Field of Classification Search
CPC .............. G06F 3/044–3/047; G06F 3/0488; G06F 3/04883; G06F 3/04886; G06F 3/023; G06F 3/041; G01C 21/3664
USPC .................................................. 345/173–175
See application file for complete search history.

(56) References Cited

U.S. PATENT DOCUMENTS

| | | |
|---|---|---|
| 8,390,572 B2 | 3/2013 | Marsden et al. |
| 2008/0012835 A1* | 1/2008 | Rimon et al. ................. 345/173 |
| 2009/0073128 A1 | 3/2009 | Marsden |
| 2010/0194682 A1* | 8/2010 | Orr et al. ....................... 345/156 |
| 2012/0007834 A1* | 1/2012 | Chen et al. ..................... 345/175 |
| 2012/0019469 A1 | 1/2012 | Westerman |
| 2012/0062488 A1 | 3/2012 | Lin et al. |
| 2012/0075192 A1* | 3/2012 | Marsden et al. .............. 345/168 |
| 2012/0113028 A1 | 5/2012 | Marsden et al. |
| 2013/0021263 A1* | 1/2013 | Tong et al. .................... 345/173 |
| 2013/0076650 A1 | 3/2013 | Vik et al. |
| 2013/0201160 A1 | 8/2013 | Ito et al. |
| 2013/0321305 A1* | 12/2013 | Liang et al. ................... 345/173 |
| 2013/0321322 A1 | 12/2013 | Kim et al. |

FOREIGN PATENT DOCUMENTS

WO 2012/091574 A1 7/2012

* cited by examiner

*Primary Examiner* — Aneeta Yodichkas
(74) *Attorney, Agent, or Firm* — McDermott Will & Emery LLP

(57) ABSTRACT

Various aspects of the subject technology relate to disambiguating user intent on a touch-sensitive input device. A system is configured to detect an initial number of touch events on a touchscreen device where each touch event corresponds to a finger of a user. The system determines whether the initial touch events on the touchscreen device are resting fingers based on at least one rest heuristic and attributes the initial number of touch events to resting fingers on the touchscreen device based on the determination. The rest heuristic may include, for example, whether the number of initial touch events on the touchscreen device exceeds a threshold number of touch events or whether the initial touch events are detected for a threshold duration.

20 Claims, 5 Drawing Sheets

US 9,207,794 B2

DISAMBIGUATION OF USER INTENT ON A TOUCHSCREEN KEYBOARD

FIELD

The present disclosure generally relates to determining user intent and, in particular, to identifying user intent on a touch-sensitive input device.

BACKGROUND

A computing system (e.g., tablet computer or smart phone) may be configured to receive user input via a touch-sensitive input device (e.g., a touchscreen). For example, the user may generate a touch event by making contact with a touchscreen device using one or more fingers at locations corresponding to keys of a keyboard. The touchscreen device may identify the key that corresponds to the location of the touch event and register a received input signal for that key.

SUMMARY

Aspects of the subject technology relate to a computer-implemented method. The method includes detecting an initial number of touch events on a touch-sensitive input device, each touch event corresponding to a finger of a user, determining whether the initial number of touch events on the touch-sensitive input device exceeds a threshold number of touch events, and attributing the initial number of touch events to resting fingers on the touch-sensitive input device when the initial number of touch events exceeds the threshold number of touch events.

Additional aspects of the subject technology relate to a system. The system may include one or more processors and a machine-readable medium comprising instructions stored therein, which when executed by the one or more processors, cause the one or more processors to perform operations. The operations may include detecting an initial number of touch events on a touch-sensitive input device, each touch event corresponding to a finger of a user, determining whether the initial number of touch events are detected for a threshold duration, and attributing the initial number of touch events to resting fingers on the touch-sensitive input device when the initial number of touch events are detected for at least the threshold duration.

Aspects of the subject technology may also relate to a machine-readable medium comprising instructions stored therein, which when executed by a machine, cause the machine to perform operations for disambiguating user intent on a touch-sensitive input device. The operations include detecting an initial number of touch events on a touchscreen device, each touch event corresponding to a finger of a user, determining whether the initial number of touch events on the touchscreen device are resting fingers based on at least one rest heuristic, and attributing the initial number of touch events to resting fingers on the touchscreen device based on the determination.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed aspects and together with the description serve to explain the principles of the disclosed aspects.

DETAILED DESCRIPTION

Figure 1:
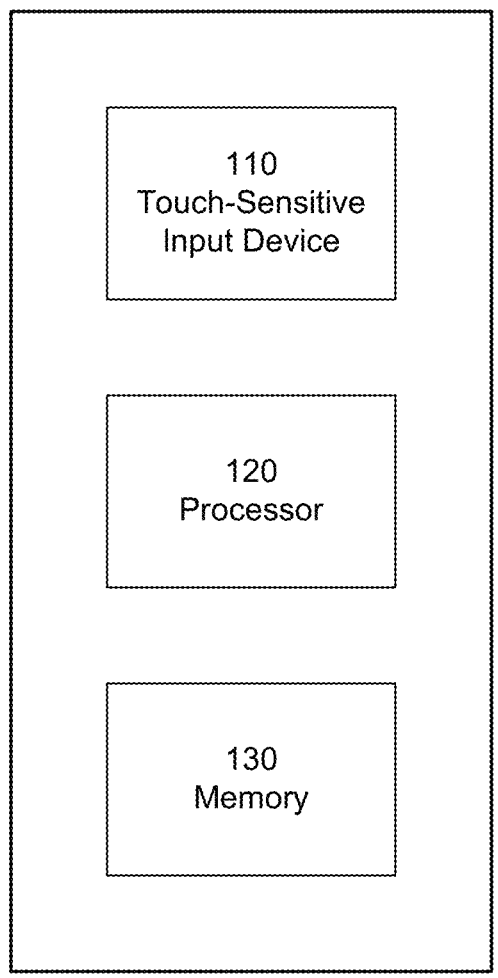
FIG. 1 is a block diagram illustrating an example system 100 configured to disambiguating user intent on a touchscreen keyboard, according to certain aspects of the subject technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology.

Computing systems may provide touch-sensitive input devices (e.g., touchscreens or touchpads) that enable users to provide touch input. A user may provide touch input by making contact with a touch-sensitive input device (e.g., using one or more fingers) at locations corresponding to keys of a keyboard. The touch-sensitive input device or a computing system in communication with the touch-sensitive input device may identify the key that corresponds to the location of the touch event and register a received input signal for that key.

In some cases, it may be difficult to determine whether a user actually intended to activate a key corresponding to a particular point of contact. For example, in a traditional, physical keyboard, users may rest their fingers on the keys without activating the key (e.g., entering a character corresponding to the key). In contrast, contact that is made with the touchscreen device when a user's fingers rests on a touchscreen device may be registered as key activations. However, resting fingers on a keyboard may provide for additional user comfort (e.g., to avoid the fatigue of keeping the user's hands or arms suspended above the keyboard) and/or provide the user with a greater feel for where the user's fingers are on the keyboard (e.g., the home row of the keyboard).

Various aspects of the subject technology relate to disambiguating a user's intent when contact is detected on a touchscreen keyboard. For example, a system may be configured to determine whether a user is resting one or more fingers on a touchscreen keyboard and/or whether the user is making contact with the touchscreen keyboard intending to activate a key on the touchscreen keyboard. The system may make these determinations based on, for example, the number of contacts detected on the touchscreen device, the location of each contact, and changes in the number of contacts and the locations of the contacts over time. In some variations, the subject technology may be implemented in touchscreen devices without the need for additional hardware, such as an accelerometer. In other variations, however, the subject technology may also be used in touchscreen devices with accelerometers.

According to some aspects, the system may be configured to detect an initial number of touch events on a touchscreen device, determine whether the initial touch events on the touchscreen device are resting fingers based on at least one rest heuristic, and attribute the initial touch events to resting fingers on the touchscreen device based on the determination. The rest heuristic may include, for example, whether the number of initial touch events on the touchscreen device exceeds a threshold number of touch events or whether the initial number of touch events are detected for a threshold duration.

FIG. 1 is a block diagram illustrating an example system 100 configured to disambiguating user intent on a touchscreen keyboard, according to certain aspects of the subject technology. The system 100 may include a touch-sensitive input device 110, a processor 120, and a memory 130 in communication with one another via a bus (not shown). According to other aspects of the subject technology, the system 100 may include additional components or modules or different components.

The system 100 may be implemented as any device with a touch-sensitive input device 110. Example systems 100 may include a mobile device (e.g., a tablet, a smart phone, GPS device, etc.), a laptop or desktop computer with a touchscreen monitor, and smart displays or other smart appliances. The processor 120 and memory 130 may be configured to be used with the touch-sensitive input device 110 to disambiguate user intent on a touchscreen keyboard. For example, the memory 130 may be one or more non-transitory machine-readable mediums that store one or more sets of instructions that may be executed by the processor 120. The touch-sensitive input device 110 may receive various signals which may be used by the processor 120 executing instructions on the memory 130 to disambiguate user intent.

In one configuration, the touch-sensitive input device 110 may be a touchscreen that is configured to one or more detect touch events caused by the presence of one or more appendages (e.g., fingers, palms, elbows, etc.) on a surface of the touch-sensitive input device 210. The touch-sensitive input device 110 may also be configured to determine positions or locations for each of the detected touch events and a duration for each of the touch events. For example, the touch-sensitive input device 110 may detect that an area on its surface is in contact with a user's appendage and convert the location of the contacted area into coordinates (e.g., (x,y) coordinates) on the touch-sensitive input device 110. The touch-sensitive input device 110 may also calculate a duration (e.g., a length of time) that the surface is in continuous contact with the user's appendage.

According to some aspects of the subject technology, the touch-sensitive input device 110 may also be configured to display a keyboard for the user. For example, the touch-sensitive input device 110 in the form of a touchscreen device may be configured to display a keyboard on the surface or screen of the touchscreen device. The keyboard may assign certain locations to different keys of the keyboard. The touch-sensitive input device 110 may determine whether the location of a touch event corresponds to the location of a key on the keyboard. If the location of the touch event corresponds to the location of the key, the touch-sensitive input device 110 may activate the key (e.g., registering a key press input or a long-press input for the corresponding key).

However, when a user rests his fingers on the keyboard of the touchscreen device, the touch events caused by the fingers making contact with the touchscreen device may cause the touch events to be registered as key activations rather than what the user intends (e.g., fingers resting on a keyboard). The system 100 may be configured to determine whether a user is resting one or more fingers on a touchscreen keyboard or whether the user is making contact with the touchscreen keyboard intending to activate a key on the touchscreen keyboard.

Figure 2:
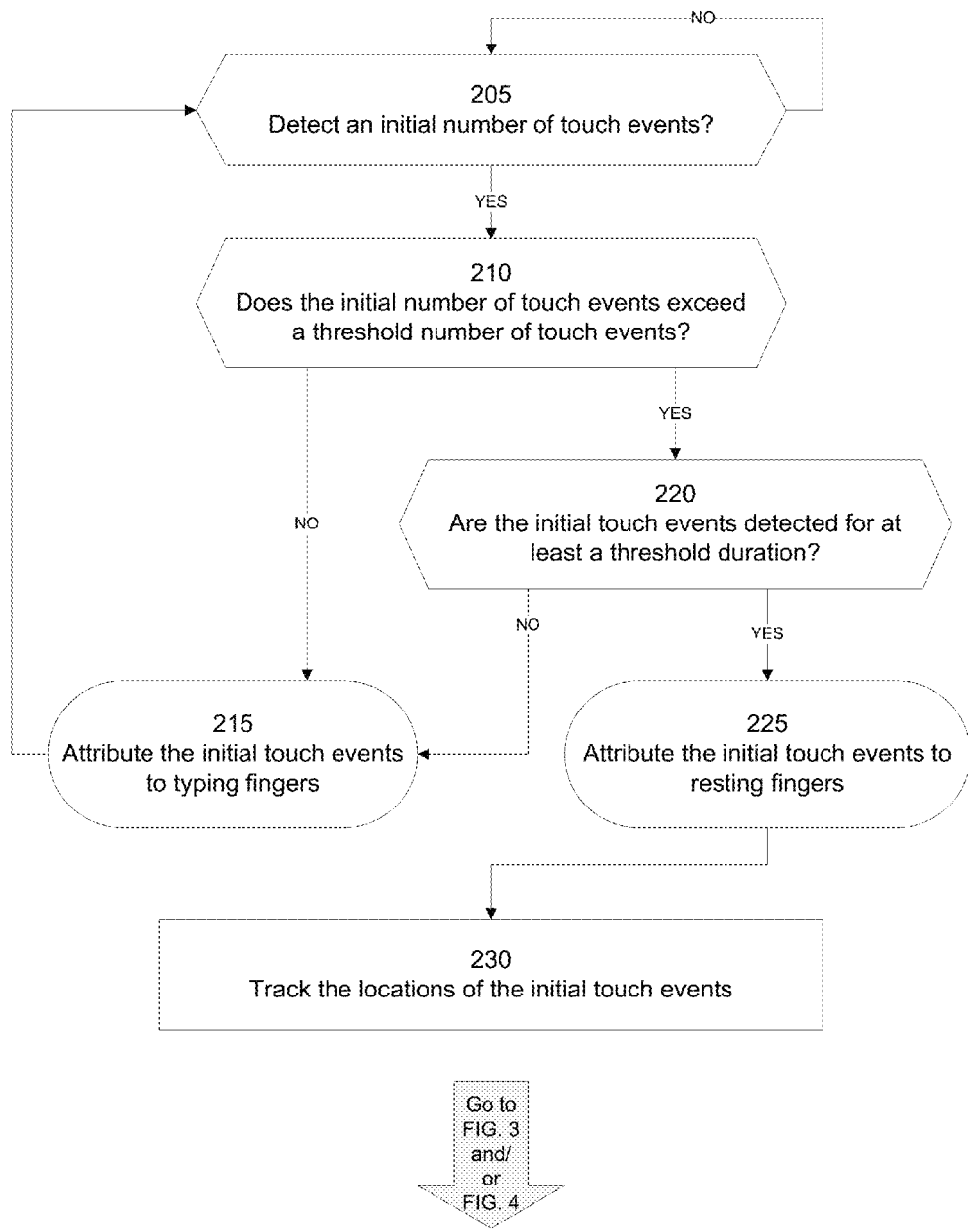
FIG. 2 is a flow diagram illustrating an example process for disambiguating user intent on a touchscreen keyboard, in accordance with various aspects of the subject technology.

FIG. 2 is a flow diagram illustrating an example process 200 for disambiguating user intent on a touchscreen keyboard, in accordance with various aspects of the subject technology. Although the steps in FIG. 2 may be discussed with respect to the components of system 100 illustrated in FIG. 1, the steps are not limited to these components. Furthermore, although the steps are shown in one particular order, other orderings of steps are also possible. For example other orderings may include additional steps, fewer steps, or steps that occur in parallel.

A system 100 may be configured to disambiguate user intent when touch events are detected on a touchscreen keyboard by determining whether an initial number of touch events have been detected by the touch-sensitive input device 110 at block 205. The initial number of touch events may be detected after a period of no touch events being detected by the touch-sensitive input device. If no touch events are detected by the touch-sensitive input device 110 the system 100 may continue to monitor the touch-sensitive input device 110 for touch events.

If one or more touch events are detected, at block 210, the system 100 may determine whether the initial number of touch events exceeds a threshold number of touch events (e.g., two touch events or six touch events). If the initial number of touch events does not exceed the threshold number of touch events, it is likely that the initial touch events are a result of one or more of the user's fingers making contact with the touchscreen keyboard with the user intending the contact to be typing. Accordingly, at block 210, the system 100 may attribute the initial number of touch events to be typing fingers. The system 100 may then identify the location of the touch events attributed to typing fingers and activate keys on the touchscreen keyboard that correspond to the typing fingers. After the initial events are attributed to typing fingers, the system 100 may return to block 205 to detect the next set of initial touch events.

If the initial number of touch events exceeds the threshold number of touch events, for example, if 6 or more fingers are making contact with the touch-sensitive device 110, it is more likely that the initial touch events are the result of a user resting fingers on the touchscreen keyboard. Accordingly, in some implementations, the system 100 may attribute the initial number of touch events to a user resting fingers on the touchscreen device when the initial number of touch events exceeds the threshold number of touch events and key activations for the initial touch events are not registered.

According to other implementations, as seen in FIG. 1, if the initial number of touch events exceeds the threshold number of touch events, the system 100 may determine whether the initial touch events are detected by the touchscreen device for at least a threshold duration (e.g., a threshold period of time) at block 220. If the number of initial touch events are not detected for a threshold duration (e.g., for 0.1 seconds), then the initial touch events may be overlapping key strokes. For example, a user may have made contact with the touchscreen keyboard with one finger to type a character without having lifted another finger used to type a previous character yet. Accordingly, the system 110 may attribute the initial number of touch events to typing fingers at block 215. The system 100 may then identify the location of the touch events attributed to typing fingers and activate keys on the touchscreen keyboard that correspond to the typing fingers. After the initial events are attributed to typing fingers, the system 100 may return to block 205 to detect the next set of initial touch events.

If, on the other hand, the initial touch events are detected for at least the threshold duration, the user is more likely to be resting fingers on the touchscreen keyboard. Accordingly, the system 100 may attribute the initial number of touch events to resting fingers at block 225 and key activations for the initial touch events are not registered.

According to some aspects of the subject technology, the duration may be calibrated based on typing data from users in the general population. The calibrated duration may then be used as the default duration when determining whether the initial contacts are detected for the duration. Additionally or alternatively, the duration may also be calibrated based on the typing data from particular user that is typing or logged in to a particular account on the touchscreen device. The calibrated duration may then be used as a personalized duration when determining whether the initial contacts are detected for the duration.

According to some aspects of the subject technology, location of the touch events may also be considered when determining whether a touch event is attributed to a resting finger or a typing finger. For example, touch events that occur on keys that belong to the "home row" (e.g., keys that are on the same row as the "a," "s," "d," "f," "j," "k," "l," and ";" keys) or are "home keys" (e.g., the "a," "s," "d," and "f" keys for the left hand and the "j," "k," "l," and ";" keys for the right hand) may be more likely to be attributed to resting fingers. The system 110 may determine whether one or more of the initial touch events correspond to the locations of the home row or home keys.

If the initial touch events are not in home row or home key locations, the system 110 is more likely to attribute the touch events to typing fingers. If the initial touch events are in home row or home key locations, the system 110 is more likely to attribute the touch events to resting fingers. For example, if the initial touch events exceed the threshold number of touch events and the threshold duration, and a majority of the initial touch events are in home row or home key locations, the system 110 may attribute the touch events to resting fingers. According to other implementations, different threshold number of touch events or threshold durations may be used based on whether the initial touch events are in home row or home key locations.

According to some aspects of the subject technology, after the initial touch events are characterized resting fingers, the system 100 may return to block 205 to detect the next set of initial touch events. However, according to other aspects, as seen in FIG. 2, after the initial touch events are characterized resting fingers, the system may continue to track the locations of the initial number of contacts in order to further disambiguate user intent on the touchscreen device at block 230 (see FIG. 3 and FIG. 4). For example, after the initial contacts are attributed to resting fingers, the system 100 may be configured to determine when a user begins typing.

Figure 3:
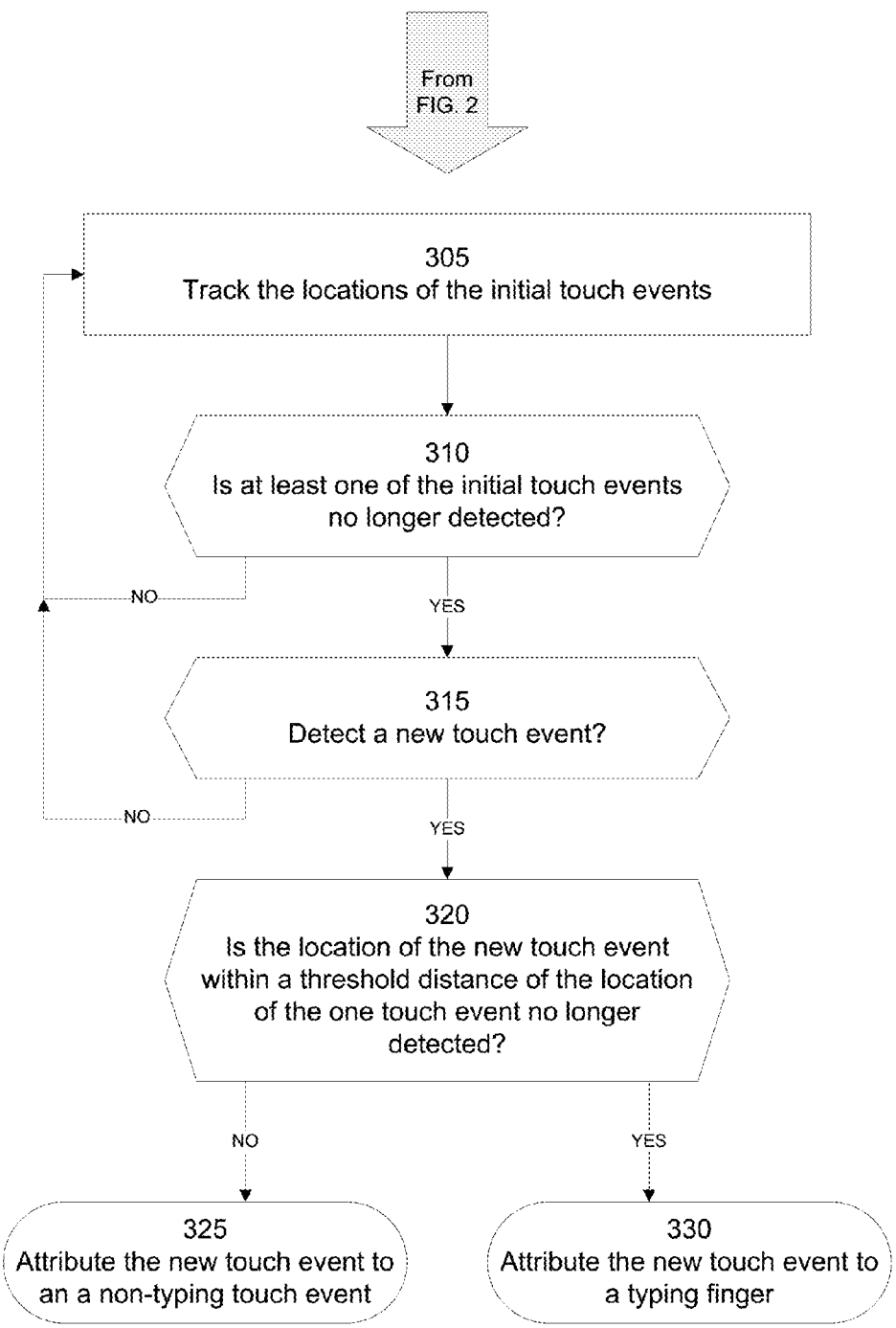
FIG. 3 is a flow diagram illustrating an example process for further disambiguating user intent on a touchscreen keyboard, in accordance with various aspects of the subject technology.

FIG. 3 is a flow diagram illustrating an example process 300 for further disambiguating user intent on a touchscreen keyboard, in accordance with various aspects of the subject technology. Although the steps in FIG. 3 may be discussed with respect to the components of system 100 illustrated in FIG. 1, the steps are not limited to these components. Furthermore, although the steps are shown in one particular order, other orderings of steps are also possible. For example other orderings may include additional steps, fewer steps, or steps that occur in parallel.

According to some aspects of the subject technology, the steps in process 300 may occur after the attributing of the initial touch events to resting fingers. For example, after the initial touch events are attributed to resting figures in FIG. 2, at block 305, the system 100 may continue to track the locations of the initial touch events. In some cases, an initial touch event may move from one location to another (e.g., if a user moves a finger across the surface of the touch-sensitive input device 110) while maintaining continuous contact with the touch-sensitive input device 110. The system 100 may monitor any changes in location for a touch event.

At block 310, the system 100 may determine whether at least one of the initial touch events is no longer detected by the touch-sensitive input device 110. For example, the user may lift a finger off of the touch-sensitive input device 110 thereby ending the touch event. If all of the initial touch events remain being detected, the system 100 may continue to track the locations of the initial touch events at block 305. If, however, one or more of the initial touch events are no longer detected, the user may be lifting one or more fingers to begin typing. Accordingly, the system 100 may determine whether a new touch event has been detected by the touch-sensitive input device 110 at block 315.

If no new touch events are detected or while no new touch events are detected, the system 100 may continue to track the locations of the initial touch events at block 305. On the other hand, if and when a new touch event is detected, this new contact may be a keystroke for a user intending to type. Accordingly, in some implementations, the system 100 may attribute the new touch event to be a typing finger. According to other implementations, however, the system 100 may further determine whether the new touch event is an inadvertent contact with the touchscreen device or another non-typing touch event.

For example, at block 320, the system 100 may determine whether the location of the new touch event is within a threshold distance of the initial touch event that is no longer detected. If the new touch event is within a threshold distance of the last known location of the initial touch event that is no longer detected, the new touch event may be from the same finger as the finger that lifted up off of the touch-sensitive input device 110 and the user may intend for the new touch event to be a typing event. The threshold distance may be configured to approximate the range that a finger in the typing position may move. For example, if an index finger resting on the J key lifts up to type, it may be expected to land on the J key or on a nearby key within the threshold distance.

At block 325, if the new touch event is not within the threshold distance, it is not likely that the new touch event is a typing finger (e.g., it may be an inadvertent touch) and the system 100 may attribute the new touch event to a non-typing touch event. If the new touch event is within the threshold distance, the system 100 may attribute the new touch event to a typing finger, identify the location of the new touch event, and activate the key on the touchscreen keyboard that correspond to the location of the typing finger.

According to some aspects of the subject technology, the threshold distance may be configured based on typing data or physical measurements from users in the general population. Additionally or alternatively, the threshold distance may also be calibrated based on the typing data or physical measurements from particular user that is typing or logged in to a particular account on the system 100.

Figure 4:
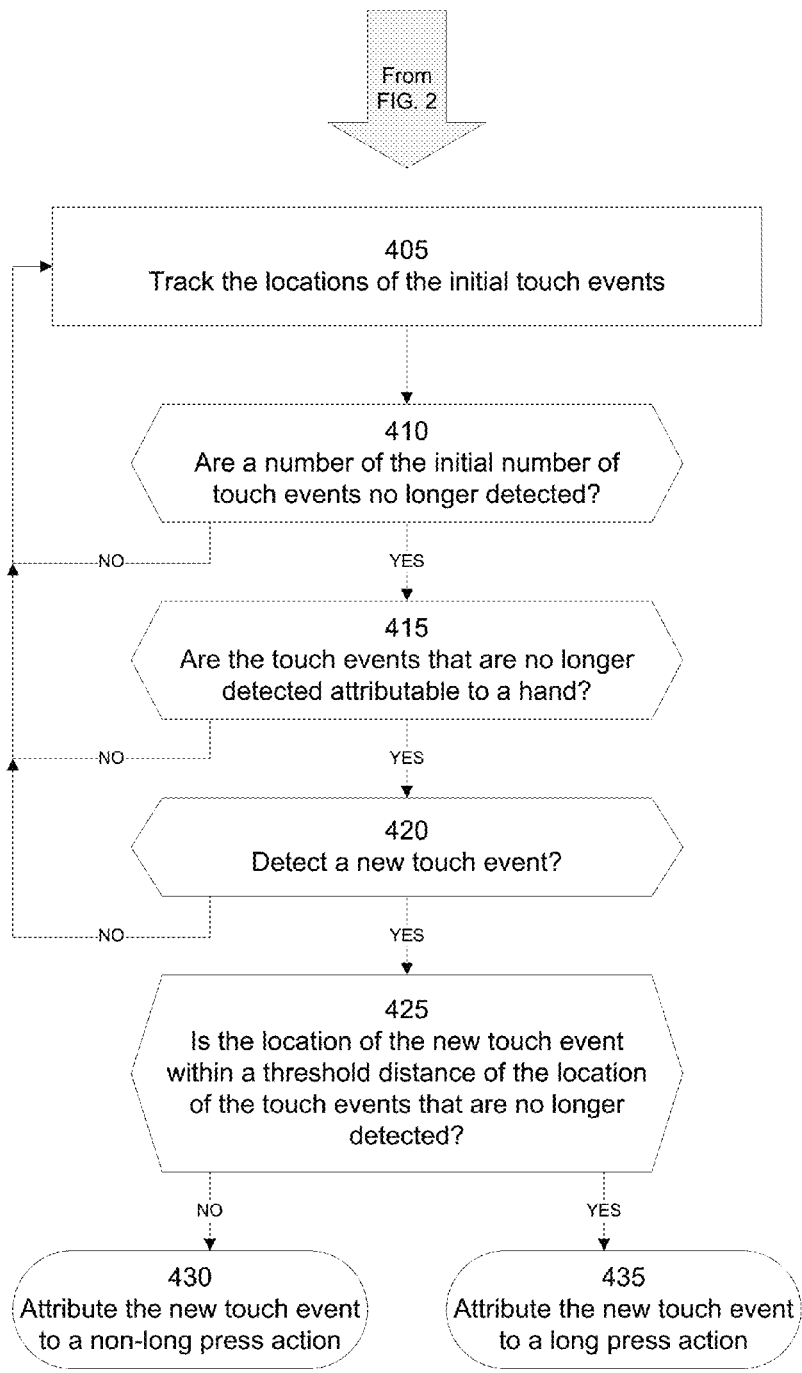
FIG. 4 is a flow diagram illustrating an example process for determining a long-press action, in accordance with various aspects of the subject technology.

The system may also be configured to determine whether a user is attempting a long-press action on the touch-sensitive input device 110. FIG. 4 is a flow diagram illustrating an example process 400 for determining a long-press action, in accordance with various aspects of the subject technology. Although the steps in FIG. 4 may be discussed with respect to the components of system 100 illustrated in FIG. 1, the steps are not limited to these components. Furthermore, although the steps are shown in one particular order, other orderings of steps are also possible. For example other orderings may include additional steps, fewer steps, or steps that occur in parallel.

If a uses has his fingers resting on the touch-sensitive input device 110 and wants to initiate a long-press, the user may raise at least one hand from the keyboard and make contact on the character the user wishes to long-press. Accordingly, after the initial touch event are attributed to resting fingers in FIG. 2, the system 100 may continue to track the locations of the initial touch events at block 405 and determine whether a number of the initial touch events are no longer detected by the touch-sensitive input device 110 at block 410. For example, the user may lift a hand up off of the touch-sensitive input device 110 to view the keyboard or to access the desired long-press key. When the user's hand is lifted, the fingers for the lifted hand may also lift off of the touch-sensitive input device 110 thereby ending touch events for those fingers.

If all of the initial touch events remain being detected, the system 100 may continue to track the locations of the initial touch events at block 405. If, however, a number of the initial touch events are no longer detected, the user may be lifting a hand in order to initiate a long-press action. Accordingly, the system 100 may determine whether initial touch events that are no longer detected may be attributed to a hand lifting off of the touch-sensitive input device 110 at block 415. For example, two to five touch events that are located with close proximity to one another that are on an end of a keyboard (e.g., the-right most touch events or the left-most touch events) may be attributable to a hand lifting off of the keyboard. Furthermore, if the touch events may be attributable to a hand if the touch events are consecutive (e.g., next to one another).

If all of the touch events that are no longer detected are not able to be attributed to a hand being lifted up, the system 100 may continue to track the locations of the initial touch events at block 405. If, however, the touch events that are no longer detected are attributable to a hand being lifted up, the system 100 may wait to determine whether a new touch event is detected at block 420. According to some aspects, the system 100 may wait for a predetermined period of time (e.g., 5 seconds) for a new touch event to be detected and/or determine if the new touch event occurs for a certain duration (e.g., a long-press duration).

If no new touch events are detected during the waiting period of time, the system 100 may return to block 405 and continue to track the locations of the initial touch events. If and when a new touch event is detected (and if the new touch event occurs for the long-press duration), at block 425, the system 100 may determine whether the location of the new touch event is within a threshold distance of the location of the touch events that are no longer detected and attributed to the hand.

If the location is within the threshold distance, the user is more likely to be initiating a long-press action. For example, the user may lift up a hand to view the keyboard and/or to press the key on the keyboard that he wants to long-press. Accordingly, the system 100 may attribute the new touch event to a long-press action for the key corresponding to the location of the new touch event at block 435. If the location of the new touch event is not within the threshold distance, the system 100 may attribute the new touch event to a non-long-press action such as an inadvertent touch event or a regular typing of a key at block 430.

Figure 5:
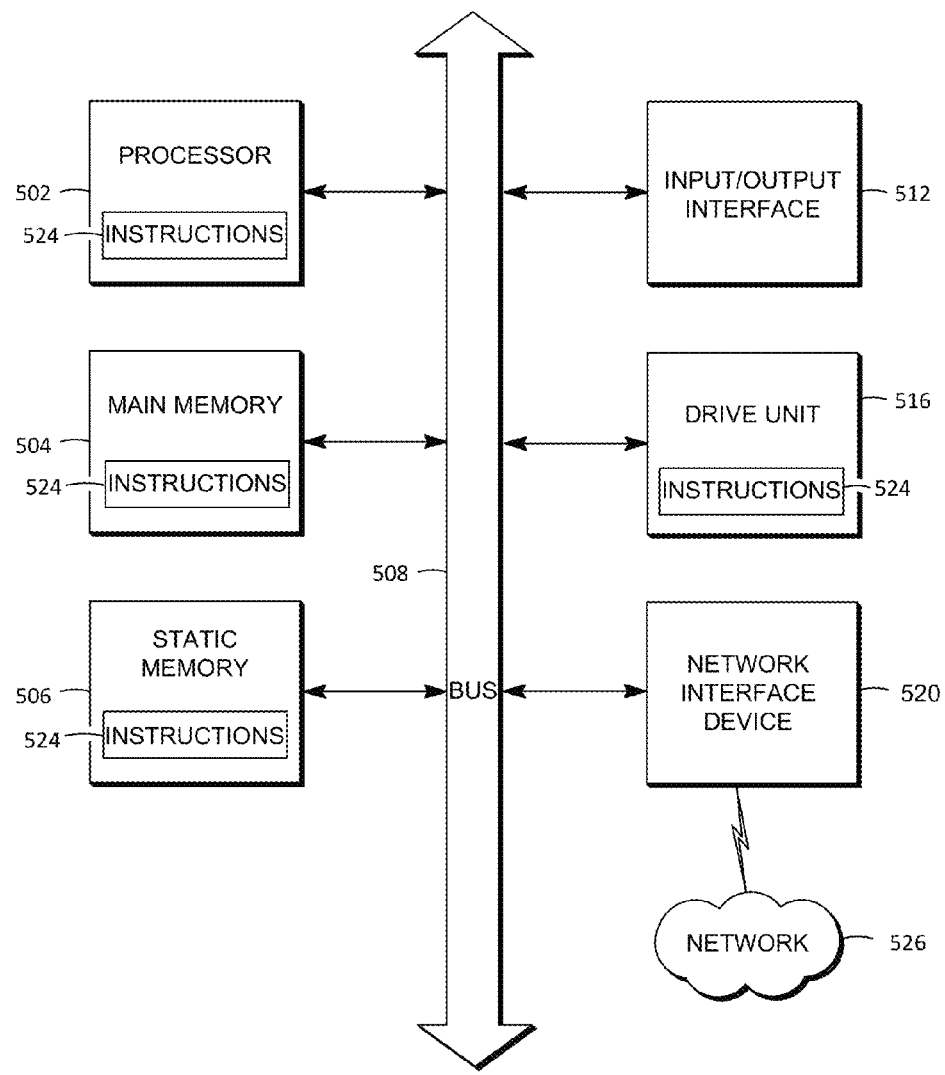
FIG. 5 is a block diagram illustrating an example computer system with which any of the systems described herein may be implemented.

FIG. 5 is a block diagram illustrating an example computer system 500 with which any of the systems described herein may be implemented. In certain aspects, the computer system 500 may be implemented using hardware or a combination of software and hardware, either in a dedicated server, or integrated into another entity, or distributed across multiple entities.

The example computer system 500 includes a processor 502, a main memory 504, a static memory 506, a disk drive unit 516, and a network interface device 520 which communicate with each other via a bus 508. The computer system 500 may further include an input/output interface 512 that may be configured to communicate with various input/output devices such as video display units (e.g., liquid crystal (LCD) displays, cathode ray tubes (CRTs), or touch screens), an alphanumeric input device (e.g., a keyboard), a cursor control device (e.g., a mouse), or a signal generation device (e.g., a speaker).

Processor 502 may be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

A machine-readable medium (also referred to as a computer-readable medium) may store one or more sets of instructions 524 embodying any one or more of the methodologies or functions described herein. The instructions 524 may also reside, completely or at least partially, within the main memory 504 and/or within the processor 502 during execution thereof by the computer system 500, with the main memory 504 and the processor 502 also constituting machine-readable media. The instructions 524 may further be transmitted or received over a network 526 via the network interface device 520.

The machine-readable medium may be a single medium or multiple media (e.g., a centralized or distributed database, and/or associated caches and servers) that store the one or more sets of instructions. The machine-readable medium may comprise the drive unit 516, the static memory 506, the main memory 504, the processor 502, an external memory connected to the input/output interface 512, or some other memory. The term "machine-readable medium" shall also be taken to include any non-transitory medium that is capable of storing, encoding or carrying a set of instructions for execution by the machine and that cause the machine to perform any one or more of the methodologies of the embodiments discussed herein. The term "machine-readable medium"

shall accordingly be taken to include, but not be limited to, storage mediums such as solid-state memories, optical media, and magnetic media.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system.

Skilled artisans may implement the described functionality in varying ways for each particular application. For example, the modules may include software instructions encoded in a medium and executed by a processor, computer hardware components, or a combination of both. The modules may each include one or more processors or memories that are used to perform the functions described below. According to another aspect, the various systems and modules may share one or more processors or memories. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

What is claimed is:

1. A system comprising:
   one or more processors; and
   a non-transitory machine-readable medium comprising instructions stored therein, which when executed by the one or more processors, cause the one or more processors to perform operations comprising:
   detecting an initial number of touch events on a touch-sensitive input device, each touch event corresponding to a finger of a user;
   attributing the initial number of touch events to a resting state of fingers on the touch-sensitive input device when the initial number of touch events exceeds a threshold number of touch events;
   tracking the locations of the initial number of touch events on the touch-sensitive input device;
   determining that at least one of the initial number of touch events is no longer detected;
   detecting, subsequent to the determining that the at least one touch event is no longer detected, a new touch event;
   determining a threshold distance of movement based on user data of an account associated with the touch-sensitive input device;
   determining whether a location of the new touch event is within the determined threshold distance of movement from the tracked location of the at least one touch event no longer detected;
   attributing the new touch event to a keystroke when the location of the new touch event is within the determined threshold distance; and
   attributing the new touch event to a non-typing touch event when the location of the new touch event is not within the determined threshold distance.

2. The system of claim 1, wherein the operations further comprise determining whether the initial number of touch events are detected for a threshold duration, wherein the attributing of the initial number of touch events to resting fingers is further based on the initial number of touch events being detected for the threshold duration.

3. The system of claim 1, wherein the operations further comprise calibrating the threshold duration based on typing data associated with the user.

4. The system of claim 1, wherein the operations further comprise attributing the initial number of touch events to a typing state of fingers on the touch-sensitive input device, when the initial number of touch events does not exceed the threshold number of touch events.

5. The system of claim 1, wherein the operations further comprise:
   tracking the locations of the initial number of touch events on the touch-sensitive input device;
   determining that at least one of the initial number of touch events is no longer detected;
   determining that the at least one touch event that is no longer detected is attributable to a hand of the user;
   detecting, subsequent to the determining that the at least one touch event is no longer detected, a new touch event that occurs for at least a predefined period of time; and
   attributing the new touch event to a long-press action in response to the detecting of the new touch event.

6. The system of claim 5, wherein the operations further comprise determining whether a location of the new touch event is within a threshold distance of the location of the at least one touch event no longer detected, wherein the new touch event is attributed to the long-press action based on the new touch event being within the threshold distance.

7. The system of claim 1, wherein the threshold number of touch events is six.

8. The system of claim 1, wherein the touch-sensitive input device is a touchscreen device.

9. The system of claim 1, wherein determining the threshold distance comprises calibrating a predetermined threshold based on a physical measurement from the user logged into the user account.

10. A method comprising:
detecting an initial number of touch events on a touch-sensitive input device, each touch event corresponding to a finger of a user;
determining whether the initial number of touch events are detected for a threshold period of time, the threshold period of time based on user typing data for the user;
determining a threshold distance of movement based on user data stored in connection with an account associated with the touch-sensitive input device; and
attributing the initial number of touch events to a resting state of fingers on the touch-sensitive input device based on the threshold period of time and the threshold distance of movement.

11. The method of claim 10, further comprising determining whether the initial number of touch events on the touch-sensitive input device exceeds a threshold number of touch events, wherein the attributing of the initial number of touch events is further based on the initial number of touch events exceeding the threshold number of touch events.

12. The method of claim 10, further comprising:
tracking the locations of the initial number of touch events on the touch-sensitive input device;
determining that at least one of the initial number of touch events is no longer detected;
detecting, subsequent to the determining that the at least one touch event is no longer detected, a new touch event;
determining whether a location of the new touch event is within the threshold distance of movement from the location of the at least one touch event no longer detected; and
attributing the new touch event to a typing state of a finger when the location of the new touch event is within the threshold distance.

13. The method of claim 10, further comprising:
tracking the locations of the initial number of touch events on the touch-sensitive input device;
determining that at least one of the initial number of touch events is no longer detected;
determining that the at least one touch event that is no longer detected is attributable to a hand;
detecting, subsequent to the determining that the at least one touch event is no longer detected, a new touch event that occurs for at least a defined period of time; and
attributing the new touch event to a long-press action in response to the detecting of the new touch event.

14. The method of claim 10, wherein the touch-sensitive input device is a touch-sensitive display.

15. The method of claim 10, wherein determining the threshold distance comprises calibrating a predetermined threshold based on a physical measurement from the user logged into the user account.

16. A non-transitory machine-readable medium comprising instructions stored therein, which when executed by a machine, cause the machine to perform operations comprising:
detecting an initial number of touch events on a touchscreen device, each touch event corresponding to a finger of a user;
determining a threshold distance of movement based on user data associated with an account of the touchscreen device;
determining whether the initial number of touch events on the touchscreen device are resting fingers based on at least one rest heuristic and the determined threshold distance of movement, the at least one rest heuristic comprising a threshold period of time based on at least user typing data; and
attributing the initial number of touch events to a resting state of fingers on the touchscreen device based on the determination.

17. The non-transitory machine-readable medium of claim 16, wherein the determining of whether the initial number of touch events are resting fingers based on at least one rest heuristic comprises determining whether the initial number of touch events on the touchscreen device exceeds a threshold number of touch events, wherein the initial number of touch events are attributed to the resting state of fingers on the touchscreen device when the initial number of touch events exceeds the threshold number of touch events.

18. The non-transitory machine-readable medium of claim 16, wherein the determining of whether the initial number of touch events are resting fingers based on at least one rest heuristic comprises determining whether the initial number of touch events are detected for a threshold period of time, wherein the attributing of the initial number of touch events to the resting state of fingers is based on the initial number of touch events being detected for the threshold duration.

19. The non-transitory machine-readable medium of claim 16, further comprising:
tracking the locations of the initial number of touch events on the touchscreen device;
determining that at least one of the initial number of touch events is no longer detected;
detecting, subsequent to the determining that the at least one touch event is no longer detected, a new touch event;
determining whether a location of the new touch event is within the threshold distance of movement from the location of the at least one touch event no longer detected; and
attributing the new touch event to a typing state of a finger when the location of the new touch event is within the threshold distance.

20. The non-transitory machine-readable medium of claim 16, further comprising:
tracking the locations of the initial number of touch events on the touchscreen device;
determining that at least one of the initial number of touch events is no longer detected;
determining that the at least one touch event that is no longer detected is attributable to a hand;
detecting, subsequent to the determining that the at least one touch event is no longer detected, a new touch event that occurs for at least a defined period of time; and
attributing the new touch event to a long-press action in response to the detecting of the new touch event.

* * * * *